July 24, 1951  R. E. RISLEY  2,561,887
BALL LOCK COUPLING
Filed Nov. 16, 1948
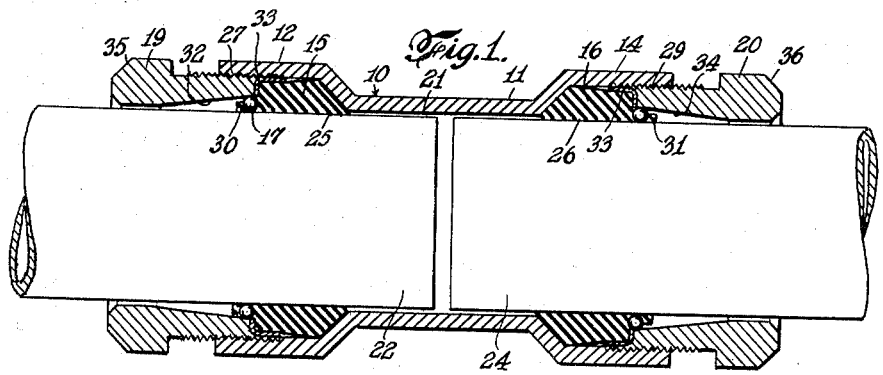
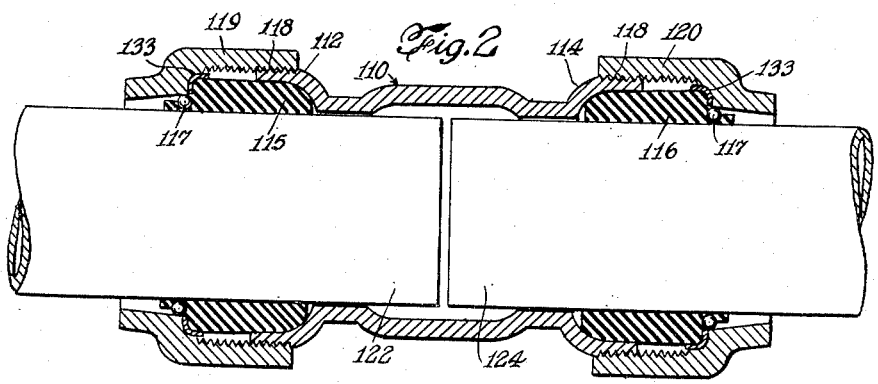
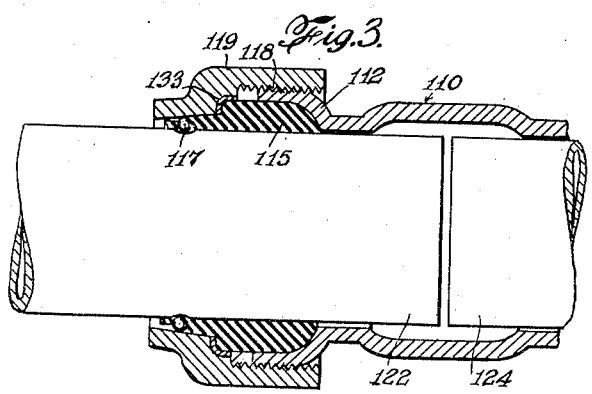
INVENTOR.
ROGER E. RISLEY
BY
Robert E. Burns
ATTORNEY.

Patented July 24, 1951

2,561,887

UNITED STATES PATENT OFFICE 2,561,887

BALL LOCK COUPLING

Roger E. Risley, Bradford, Pa., assignor to Dresser Industries, Inc., Cleveland, Ohio, a corporation of Pennsylvania Application November 16, 1948, Serial No. 60,373

6 Claims. (Cl. 285—196)

This invention relates to pipe couplings and more specifically to a coupling for connecting together sections of pipe in a fluid tight relationship and also able to withstand longitudinal stress between the pipe sections.

The coupling is of particular use in a vertical pipe arrangement such as used in water wells and the like. In such a system the well may be as much as 200 to 300 feet deep although commonly it is on the order of about 100 to 150 feet in depth. Heretofore, in many cases, the connections on the suction line have been made with regular screw fittings. Thus the weight of the entire pipe is supported by the screw fittings often placing an undue strain on the connection.

In order to facilitate the making of pipe connections, it is proposed to use "slip" couplings so that the connections may be made in an expeditious manner. However, it has been found that such constructions as have been heretofore proposed are not wholly satisfactory, since efforts to provide a satisfactory locking engagement with the walls of the pipe sections have resulted in lessening the effectiveness of the gasket seal. Many of such constructions have been based upon a ball lock mechanism which is dependent upon an outward longitudinal movement of the pipe to drag the balls into a wedge portion of the body. That is, the lock is not actuated upon installation but rather only upon the application of longitudinal stress to the line. A considerable amount of travel is required to insure actuation, and even so, there has been occasional failures of proper actuation even with the best arrangements of gripping means. In some cases, it has been found that the lock would be actuated before the gasket was fully compressed, or vice versa, when the compressing means was tightened using the torque normally contemplated in the installation of a coupling of this type.

The present invention aims to overcome the difficulties of prior devices by providing a coupling in which the parts are engaged first, to make a sealing connection, and thereafter, to wedge the members into locking position to prevent longitudinal separation of the sections of the pipe.

Another object of the invention is to provide a coupling which is simple and economical in manufacture, efficient in operation and durable in use.

In accordance with the invention, this is accomplished by providing a coupling including a tubular member having an enlarged end to provide a gasket recess together with a follower adapted to engage with the tubular member to hold a gasket in position in the recess. The gasket is formed with a projecting tail portion in which is embedded a series of annularly spaced members such as balls which are adapted, upon the tightening of the follower, to be forced into locking engagement with the wall of the pipe and the coupling.

This construction is particularly advantageous in an installation utilizing tubing with relatively light walls so that the tubing collapses sufficiently to maintain a proper relationship between the force required to lock the balls and that required to compress the gaskets.

Other objects and advantages of the invention will be apparent from the following description and from the accompanying drawings which show, by way of example, two embodiments of the invention.

In the drawings:

Fig. 1 is a longitudinal sectional view of a coupling in accordance with the invention in position for connecting the meeting ends of a pair of pipe sections. The coupling is shown in the loosened position, that is, prior to the tightening of the followers.

Fig. 2 is a view corresponding to Fig. 1 of a modified form of the invention in which internally threaded followers are adapted to overlie externally threaded ends of the tubular member.

Fig. 3 is a longitudinal sectional view of the left-hand half side of the coupling shown in Fig. 2 with the follower tightened into position so that the ball locking members are wedged into position slightly indenting the wall of the tube.

Referring to the drawings, there is shown a coupling 10 in accordance with the invention comprising a tubular member or middle ring 11 having enlarged ends 12 and 14 to provide recesses for gaskets 15 and 16. The gaskets have embedded in their outward or tail portions a series of locking members or balls 17. The gaskets 15 and 16 are adapted to be urged into position in the gasket recesses by followers 19 and 20.

The tubular member or middle ring 11 has an inner diameter at its intermediate sections 21 such as to slidably receive the ends of pipe sections 22 and 24. The enlarged portions 12 and 14 are formed so as to produce outwardly sloping internal surfaces 25 and 26 which are designed to aid in urging the gaskets 15 and 16 in tight sealing relationship with the pipe sections 22 and 25 as the follower members 19 and 20 are tightened. The outer ends of the enlarged portions 12 and 14 are internally threaded as indicated at 27 and 29.

The gasket members 15 and 16 are made of any suitable material resistant to action by the fluids carried in the pipe sections 22 and 24 and adapted to have a certain amount of resiliency for a purpose as will hereinafter appear. The gaskets are formed with an internal diameter such as to permit their being slipped over the ends of the pipe sections 22 and 24 and have bevelled inner ends to conform to the shape of the outwardly sloping surfaces 25 and 26 of the gasket recesses. The axial length of the gaskets along the pipe sections are predetermined as will hereinafter appear. The outer ends of the gaskets are formed with outwardly extending projections or tails 30 and 31 in which are at least partially imbedded the locking members 17. If preferred, the gaskets 15 and 16 may be provided with collar rings 33 to facilitate the tightening of the followers without the tendency to distort the outer edges of the gaskets.

The followers 19 and 20 are formed with an inner diameter such that they will freely slide over the surface of the ends of the pipe sections 22 and 24. The inner ends of the inner follower surfaces are tapered outwardly as indicated at 32 and 34, the angle of the taper being such that when the coupling is in the tightened position, the locking members 17 will be wedged in position between the tapered surfaces and the walls of the pipes intermediate of the ends of the length of the tapered surface. The outer surfaces of the inner ends of the followers are externally threaded to engage with the internal threaded surfaces 27 and 29 of the tubular member 11. The outer ends of the followers are thickened as indicated at 35 and 36 to provide surfaces for engagement by a pipe wrench in tightening the coupling in position. If desired, the follower ends 35 and 36 may be formed with flattened surfaces for engagement by a conventional wrench. It should be noted that the external diameter of the followers 19 and 20 need be no greater than the external diameter of the enlarged ends 12 and 14 of the tubular member 11, so that the coupling has an over-all uniform diameter.

The lock members or balls 17 may be made of any suitable material to withstand the compressive stress to which they are submitted. The diameter and number of the balls is made such that when positioned in the coupling in its tightened position on the ends of a pair of pipe sections, the balls are in substantially contiguous relationship thus acting as a barrier to prevent the extrusion of the gasket material therebetween.

The various parts of the coupling are constructed and arranged so that when the gaskets 15 and 16 are placed in position and the followers 19 and 20 tightened, a sealing relationship occurs between the gaskets and the end portions of the pipe sections.

The axial length of the gaskets tails 30 and 31, the position of the locking balls 17 in the tails, and the axial length of the gaskets are such that upon the starting of the tightening of the followers, a seal is made by the gasket with the wall of the pipe. During this stage, the tails 30 and 31 prevent premature locking of the balls 17. Further tightening of the followers causes the gasket material to urge the locking balls into the contiguous position with each other and into locking engagement with the walls of the pipe sections.

Another embodiment of the invention is shown in Fig. 2 in which corresponding parts are designated by the same reference numerals as in Fig. 1 with the addition of 100. In Fig. 2, there is shown a coupling member 110 having enlarged ends 112 and 114 providing recesses for gasket members 115 and 116. Followers 119 and 120 are made with their inner ends of a diameter so as to overlie ends 112 and 114 of the tubular member. The inner surfaces of the followers 119 and 120 and the external surfaces of the enlarged ends 112 and 114 are threaded as indicated at 118 to provide means for securing the parts together. This form of the invention is advantageous in that somewhat larger surfaces are provided for engagement with a pipe wrench.

While the invention has been described and illustrated with reference to specific embodiments thereof, it will be understood that other embodiments may be resorted to without departing from the invention. Further, while the invention has been described and illustrated with reference to a coupling for the meeting ends of straight pipe sections, it is to be understood that the invention is also applicable to all other types of fittings, such as adapters, elbows, tees and the like. Therefore, the form of the invention set out as above should be considered as illustrative and not as limiting the scope of the following claims.

I claim:

1. A pipe coupling comprising a tubular member having an enlarged end providing a gasket recess, a follower arranged to engage with the wall of the tubular member to compress a gasket in the recess, the follower having a recess on its inner surface, a gasket shaped to fit said recess of the tubular member and a plurality of closely spaced individual locking members whereby upon the engagement of the follower with the tubular member the gasket is compressed inwardly into sealing relationship with the wall of the pipe and the locking members are forced radially into gripping relationship therewith, to resist relative axial displacement of the pipes joined by said coupling.

2. A pipe coupling comprising a tubular member having an enlarged end providing a gasket recess, a follower arranged to engage with the wall of the tubular member to compress a gasket in the recess, the follower having a tapered recess on its inner surface, a gasket shaped to fit in the recess, and a plurality of closely spaced locking balls at least partially embedded in the gasket, whereby upon the engagement of the follower with the tubular member the gasket is compressed inwardly into sealing relationship with the wall of the pipe and the locking balls are forced radially inwardly into gripping relationship therewith, to resist relative axial displacement of the pipes joined by said coupling.

3. A pipe coupling comprising a tubular member having an enlarged end providing a gasket recess, a gasket shaped to fit in the recess, a plurality of closely spaced locking balls at least partially embedded in the gasket, and a follower having a tapered recess on its inner surface, the follower being constructed to engage the wall of the tubular member to compress the gasket inwardly into the recess, the compressed gasket being arranged to urge the locking balls radially inwardly into the follower recess and into contiguous relationship with each other and into gripping relationship with the wall of the pipe, whereby to resist relative axial displacement of the pipes joined by said coupling.

4. A pipe coupling comprising a tubular member having an enlarged end providing a gasket recess, a follower arranged to engage with the wall of the tubular member to compress a gasket in the recess, the follower having a tapered recess on its inner surface, a gasket shaped to fit in the recess and having an outwardly projecting portion of a reduced diameter so as to fit freely within the tapered recess of the follower, and a plurality of closely spaced locking balls at least partially embedded in the outwardly projecting portion of the gasket, the locking balls being of a number and having a diameter so that when the coupling is in tightened position on the pipe with which it is to be used the locking balls are as a result of radial inward displacement substantially contiguous and are positioned intermediate the ends of the tapered recess of the follower in contacting relationship with the wall of the pipe and the tapered surface of the recess, whereby to resist relative axial displacement of the pipes joined by said coupling.

5. A pipe coupling comprising a tubular member having an internally threaded enlarged end providing a gasket recess, an externally threaded follower arranged threadedly to engage with the inner wall of the tubular member to compress a gasket in the recess, the follower having a tapered recess on its inner surface, a gasket shaped to fit in the recess of the tubular member and having an outwardly projecting portion of a reduced diameter so as to fit freely within the tapered recess of the follower and providing a shoulder for engagement by the follower, and a plurality of closely spaced locking balls at least partially embedded in the outwardly projecting portion of the gasket, the outwardly projecting portion of the gasket having such length and the locking balls being of such a number and having such a diameter so that when the coupling is in tightened position on the pipe with which it is to be used, the gasket is crowded outwardly against the locking balls which are thereby forced together and moved axially outwardly intermediate the ends of the tapered recess of the follower and forced radially inwardly into contacting relationship with the wall of the pipe and the tapered surface of the recess, whereby to resist relative axial displacement of the pipes joined by said coupling.

6. A pipe coupling comprising a tubular member having an externally threaded enlarged end providing a gasket recess, and externally threaded follower arranged to threadedly engage with the outer wall of the tubular member to compress a gasket in the recess, the follower having a tapered recess on its inner surface, a gasket shaped to fit in the recess of the tubular member and having an outwardly projecting portion of a reduced diameter so as to fit freely within the tapered recess of the follower and providing a shoulder for engagement by the follower, and a plurality of closely spaced locking balls at least partially embedded in the outwardly projecting portion of the gasket, the outwardly projecting portion of the gasket having such a length and the locking balls being of such a number and having such a diameter so that when the coupling is in tightened position on the pipe with which it is to be used the gasket is crowded outwardly against the locking balls which are forced together and moved axially outwardly intermediate the ends of the tapered recess of the follower and forced radially inwardly into contacting relationship with the wall of the pipe and the tapered surface of the recess, whereby to resist relative axial displacement of the pipes joined by said coupling.

ROGER E. RISLEY.

REFERENCES CITED

The following references are of record in the file of this patent:

UNITED STATES PATENTS

| Number | Name | Date |
|---|---|---|
| 2,283,975 | Dillon | May 26, 1942 |
| 2,460,032 | Risley | Jan. 25, 1949 |